United States Patent
Balke et al.

[15] 3,635,429
[45] Jan. 18, 1972

[54] AIRCRAFT VIBRATION COMPENSATION SYSTEM

[72] Inventors: Rodney W. Balke, Dallas; David L. Kidd, Arlington, both of Tex.

[73] Assignee: Textron Inc., Providence, R.I.

[22] Filed: Mar. 27, 1970

[21] Appl. No.: 23,258

[52] U.S. Cl. .................................................. 244/93
[51] Int. Cl. .................................................. B64c 17/00
[58] Field of Search .............. 244/93, 75, 76, 17.27; 74/5.5; 188/1 B; 248/358

[56] References Cited

UNITED STATES PATENTS

| | | | |
|---|---|---|---|
| 3,497,164 | 2/1970 | Horak | 188/1 X |
| 3,514,054 | 5/1970 | Maid et al. | 188/1 X |

Primary Examiner—Trygve M. Blix
Assistant Examiner—Carl A. Rutledge
Attorney—Kenyon & Kenyon Reilly Carr & Chapin

[57] ABSTRACT

Apparatus is disclosed that minimizes the effect of rotor blade induced vibratory disturbances at the pilot's seat and in the cabin of an aircraft. The apparatus generates a reciprocating force which is applied to the aircraft to modify the mode of vibration of the fuselage in such a fashion that the magnitude of the vibration disturbance at any selected area of the fuselage, such as at the pilot's seat, is minimized. The compensatory reciprocating force is developed by vibrating a mass mounted on the fuselage. A control signal equal in frequency to the disturbing rotor blade vibration is applied to the vibrating mass, to cause it to reciprocate relative to the fuselage at a frequency equal to the undesired disturbing vibration. Pilot or automatic variation of the phase and amplitude of the control signal permits the pilot to achieve a minimum felt vibratory disturbance at the pilot's seat.

10 Claims, 2 Drawing Figures

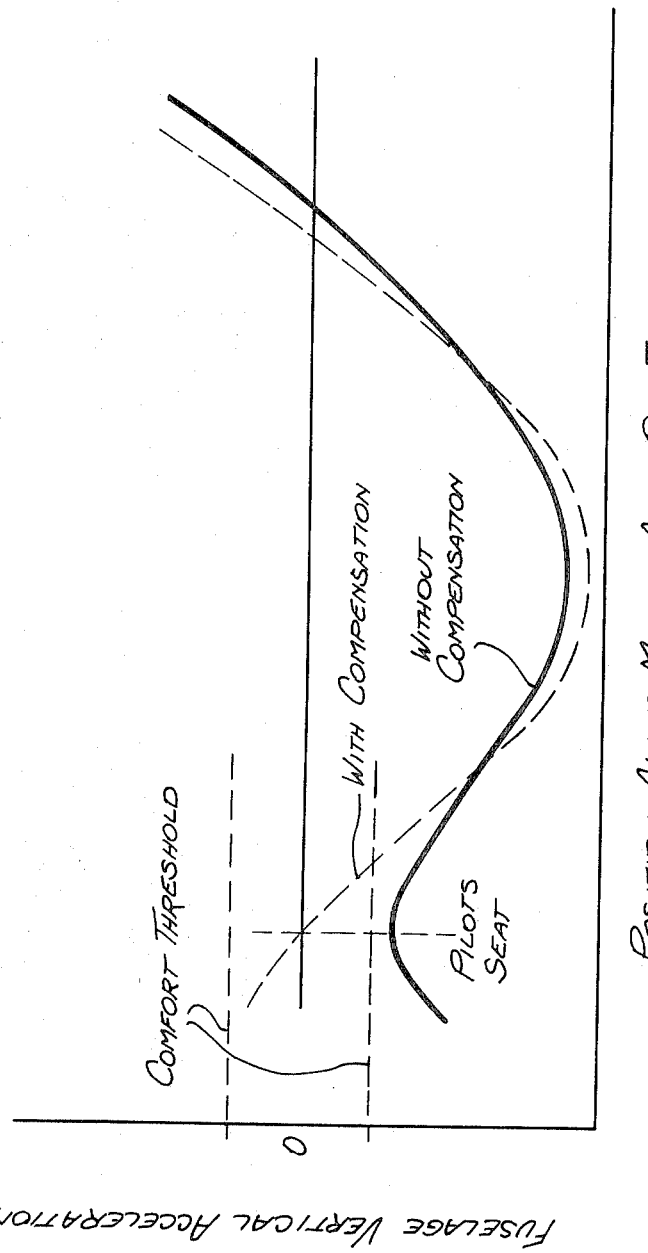

AIRCRAFT VIBRATION COMPENSATION SYSTEM

This invention relates in general to a technique for changing the mode of vibration of an aircraft at one more frequencies and more particularly to a technique for changing the mode of vibration in a fashion that reduces the effects of rotor blade induced vibrations in the helicopter.

CROSS-REFERENCE TO RELATED APPLICATION

This application is directed to the same field of technology as is disclosed in copending patent application entitled "Aircraft Vibration Compensation System" filed May 6, 1969 by Rodney W. Balke and having Ser. No. 822,136 and assigned to the same assignee as is the present patent application.

BACKGROUND OF THE INVENTION

Rotary wing aircraft, such as helicopters and autogyros, and hereafter referred to generically as helicopters, produce considerable vibration due to the rotation of the rotor blades, this vibration being transmitted to the passengers and pilot in the helicopter. In order to provide a more comfortable and less tiring ride for the passengers in the helicopter and to minimize fatigue by the pilot, it is desirable to reduce the impact of the rotor-generated vibrations in the fuselage, or at least those portions of the fuselage occupied by the pilot and passengers. The following discussion will refer to a helicopter having two rotor blades, keeping in mind that similar conditions apply to helicopters having more than two blades although the frequency of the vibratory disturbances and their amplitudes will correspondingly differ from a two-bladed helicopter.

The major vibratory disturbances caused by rotation of the rotor blades in a two-bladed helicopter are called one per rev and two per rev disturbances. These disturbances are essentially sinusoidal disturbances transmitted from the pylon to the fuselage, the pylon consisting normally of the gear box, rotor shaft and rotor blades. The one per rev disturbances approximate a sinusoidal force disturbance having a period equal to the time it takes for one complete rotation of the rotor blades. A two per rev disturbance is essentially a sinusoidal force disturbance having a period equal to the time it takes for 180° of rotation of the rotor blades, of a two bladed rotor, this time being one-half as long as the period of a one per rev disturbance.

A one per rev disturbance may be caused by out of balance rotor blades, that is, where one of the two rotor blades has a greater mass or greater inertia than the other rotor blade. The resulting one per rev force disturbance due to this condition occurs in a plane perpendicular to the helicopter mast or as is hereinafter called, a horizontal plane. Another source of one per rev disturbances occurs when the helicopter blades are out of track, that is, when one of the blades produces more lift than the other blade This results in a disturbance in a direction parallel to the helicopter mast or in a vertical direction. These one per rev disturbances or forces are transmitted from the rotor blades through the pylon to the fuselage where they are felt by both the pilot and passengers.

Two per rev disturbances result, in part, from the asymmetric flow of air across the two rotor blades. This asymmetric flow of air results primarily from the fact that for counterclockwise rotation of the rotor blades, as viewed looking down at the rotor blades, the rotor blade on the right is moving forward with the helicopter while the rotor blade on the left is moving backward. This results in a two per rev disturbance which causes both horizontal and vertical forces to be transmitted to the fuselage.

Of course, higher harmonies are also generated by the rotor and transmitted to the fuselage as a result of out-of-balance rotor blades and asymmetrical airflow.

While it is possible to minimize one per rev vertical disturbances by assuring proper blade balance and blade tracking, the two per rev disturbances are an inevitable result of the operation of a two-bladed helicopter. The result of these disturbances is that the normal helicopter modes of vibration are excited by the combination of vertical shear, pitch moments and roll movements which result from the above-mentioned causes.

There have been several prior art attempts made aside from the techniques noted in the above-identified patent application to minimize the effects of rotor blade vibratory disturbances with the techniques of these prior art attempts meeting with relatively limited success. In the above-identified copending patent application a very effective system for reducing the effects of rotor blade induced vibratory disturbances in the cockpit and cabin of a helicopter is disclosed which includes applying a force between the pylon and the fuselage that is out of phase with and in opposition to the different components of the rotor blade induced vibratory disturbances. This system is successful in minimizing the effects of rotor blade induced vibratory disturbances in the cabin and cockpit of the aircraft with the result that the disturbances in other parts of the aircraft may be somewhat increased.

It is a broad object of the present invention to provide an apparatus for reducing the effects of rotor blade vibratory disturbances in the cockpit and cabin of a helicopter.

A further object of the present invention is to provide a technique for reducing the effects of rotor blade vibratory disturbances in the cockpit and cabin of a helicopter while at the same time avoiding greatly increasing the stresses and strains on other portions of the fuselage.

Still another object of the present invention is to provide an apparatus for minimizing the rotor blade vibratory disturbances which may be transmitted to the fuselage in the lateral direction and in the fore and aft direction as well as in the vertical direction.

A further object of the present invention is to provide apparatus that is simple in construction and reliable in operation that will achieve each of the foregoing objects.

SUMMARY OF THE INVENTION

Briefly, in one embodiment of the invention, the foregoing and other objects are achieved by affixing two piston and cylinder arrangements to a helicopter fuselage adjacent the cockpit and cabin thereof. A separate mass is attached to the piston rod of each piston. The cylinders are affixed to the fuselage. Servo valves control the movement of the pistons, piston rods and masses relative to the fuselage. A means is provided for actuating the servo valves to sinusoidally move the pistons and masses relative to the fuselage at a frequency equal to and in the same direction as the vibratory motion for which compensation is desired. As a result, the masses, through the cylinders, apply a reciprocating force to the fuselage in such phase as to reduce the vibratory disturbances. The result is a net reduction of vibration in the cockpit and cabin of the fuselage.

The control signal that sinusoidally controls the servo valves is derived from a detector signal whose frequency is a function of the rotational speed of the rotor blades. The detector signal employed to minimize a one per rev disturbance has a frequency equal to the rotational speed of the rotor blades. The detector signal employed to minimize a two per rev disturbance has a frequency twice the rotational speed of the rotor blades. The detector signal is amplified to provide the control signal that is applied to the servo valves to cause the pistons and associated masses to reciprocate at the frequency of the detector signal. Manually operable amplifier control means permit pilot control of the magnitude of the control signal and thus pilot control over the magnitude of the sinusoidal force applied to the fuselage. Manually operable phase control means may be used to permit pilot control of the phase of the sinusoidal force applied to the fuselage.

Separate means may be provided for the one per rev and two per rev signals with separate amplitude and phase controls to provide a composite signal for controlling the pistons and their respective masses. In this fashion by varying amplitude and/or phase the pilot can obtain a minimization of both one/rev and two/rev disturbances in the cockpit and cabin of the helicopter. Vibrations of frequencies higher than two per rev can be similarly minimized by employing detector signals with appropriate frequencies.

BRIEF DESCRIPTION OF THE DRAWINGS

Other objects, aspects and features of the present invention will be apparent from the following description and drawing in which:

FIG. 2 illustrates graphically the improved results that are obtainable with the FIG. 1 apparatus.

DESCRIPTION OF THE PREFERRED EMBODIMENTS

Figure 1:
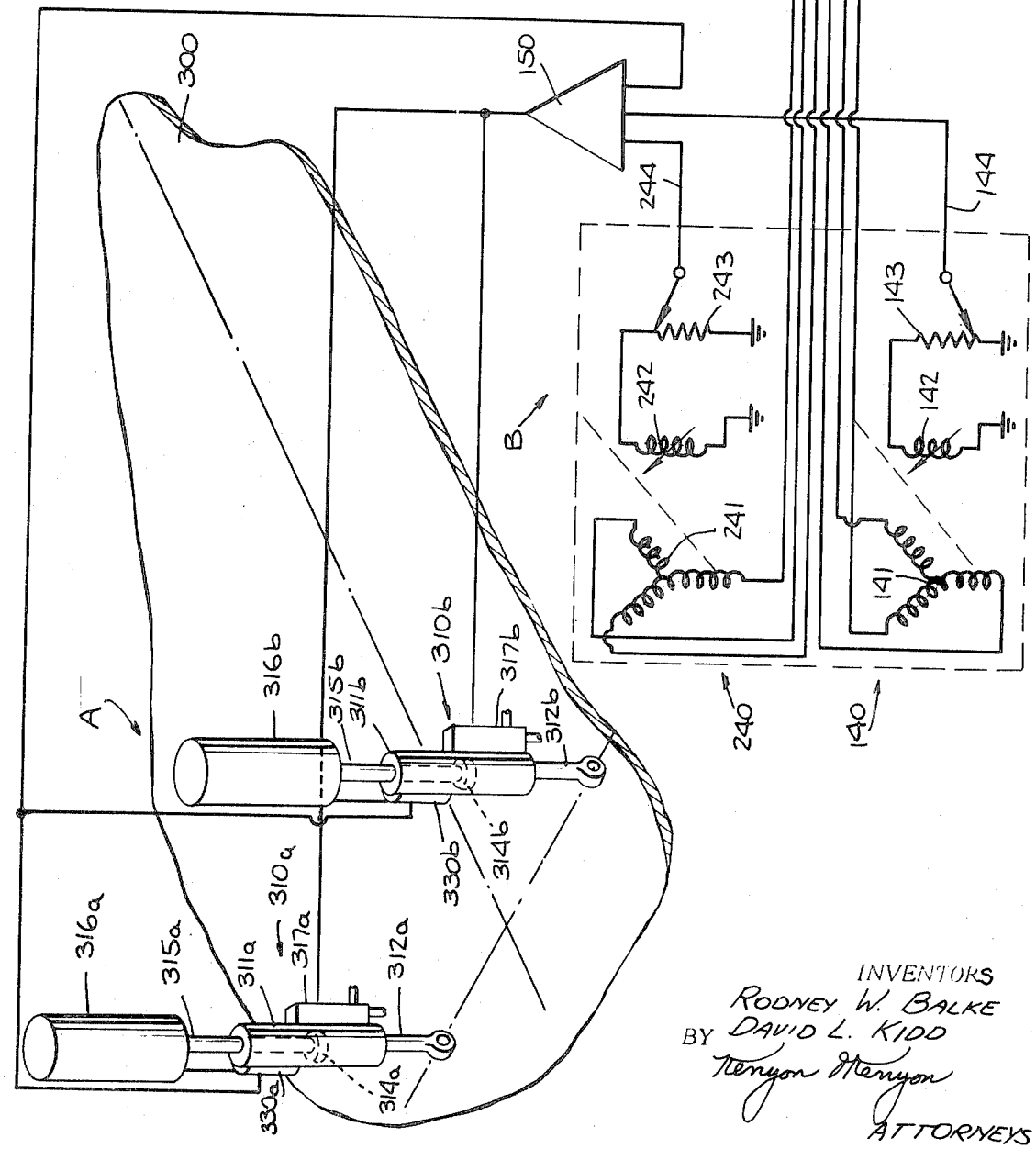
FIG. 1 is a schematic illustration of an embodiment of the invention used to compensate for a vertical component of the rotor blade vibratory disturbances.

Referring now to FIG. 1 wherein the vibration compensating means A of the present invention are shown as being controlled by a frequency sensing and control means B. Frequency sensing and control means B are substantially identical to the circuit disclosed in the above-noted patent application and will be described briefly herein in order that the present application will provide an adequate disclosure without forcing a reader of the present application to refer to the above-noted application for an understanding of the present invention.

As can be seen in FIG. 1, the sensing and control means B includes a first synchro-drive transformer 110 which includes a coil 111 and a rotatable wye (Y) coil 113 (a delta winding could be used if desired). Coil 111 can be excited by any alternating power source that is available on a helicopter. Rotatable coil 113 is rotated at the same speed as is the helicopter rotor mast in order to generate a frequency equal to the frequency of the one per rev disturbance. This can be done by directly coupling coil 113 to the helicopter rotor mast.

A second synchro-drive transformer 210 is similar to transformer 110 and thus corresponding elements of transformers 210 and 110 are designated by numbers having the same last two digits. Rotatable coil 213 of transformer 210 is driven at twice the helicopter rotor speed, by step-up gearing for example. As a result, the rotational frequency of coil 213 equals the frequency of the two per rev disturbance.

Slip rings, brushes, etc., are used with coils 113 and 213 to pick off the signals produced by the coils. The outputs of coils 113 and 213 are coupled to "Y" coils 141 and 241, respectively, which are part of the one per rev and to per rev controls 140 and 240, respectively. The one per rev and two per rev controls are similar and corresponding elements are designated by numerals having the same last two digits. As the controls 140, 240 function in a manner similar to each other a description of one control will provide an understanding.

Adjacent to coil 141, of one per rev control 140, is a transformer circuit including a variable inductor coil 142 and a variable resistor 143. The controls for changing the inductance of coil 142 and the resistance of resistor 143 are preferably located on the pilot console. Conductor 144 leads to a summing amplifier 150, as does conductor 244 in the two per rev control unit.

If it is desired to change the phase of the signals supplied to amplifier 150 by the one per rev control, all that is necessary is to vary the inductance of coil 142 and the control therefore. If it is desired to change the amplitude of the signal supplied to amplifier 150 from the one per rev control the resistance of resistor 143 is varied by the control therefore.

The structure for applying vibratory forces to the helicopter fuselage 300 is shown in the embodiment of FIG. 1 to include identical force applying devices 310a and 310b located symmetrically with respect to the centerline of the fuselage on the forward part of the cabin. However, depending upon the particular result desired, the force applying devices need not necessarily be symmetrically disposed nor need the force inputs necessarily be equal. In fact, only one force-applying device might be employed.

The force-applying devices 310a and 310b are positioned to apply a vertical force the embodiment of the invention shown in the Figures in order to compensate for the vertical component of the vibratory disturbances. As the two force-applying devices 310a, 310b of this embodiment are identical to each other a description of one force applying device will be sufficient for an understanding of the present invention. Corresponding elements of the force-applying devices have the same basic reference numerals with the numerals for the device 310a followed by an $a$ and for the device 310b followed by a $b$.

Force applying device 310a includes a cylinder 311a mounted to fuselage 300 through a link 312a. Within the cylinder 311a is a piston 314a having a piston rod 315a to which is attached a mass 316a. Thirty pound masses were successfully employed in one embodiment. A servo valve 317a which controls hydraulic fluid to cylinder 311 is in turn controlled by amplifier 150.

A datum transducer 330a is used to keep the piston 314a positioned in the center of the cylinder 311a under maneuvering accelerations and other relatively long duration acceleration changes.

The embodiment of the invention disclosed in the Figures is positioned to compensate for the vertical vibratory motions resulting from the rotor blade vibratory disturbances and the piston and cylinder arrangements are accordingly positioned to exert a net vertical force on the helicopter fuselage. If it were desired to compensate for lateral vibratory motions then the piston, cylinder and mass arrangements illustrated in FIG. 1 would be positioned to exert a lateral force on the fuselage. If desired to compensate for all the different components of the vibratory motions, then three different piston, cylinder and mass arrangements could be used, one aligned laterally, one aligned fore and aft and one aligned vertically (as shown).

While a piston and cylinder arrangement has been illustrated it is to be understood that any reciprocating motor or mechanically driven oscillator could be used to practice the present invention. One such reciprocating motor might be an electric motor having a reciprocating linear output to which a mass could be attached.

OPERATION

During flight the vibrations resulting from the two per rev disturbances will be felt as such by the pilot who will introduce an initial magnitude of two per rev compensation by adjusting the two per rev controls. He will vary the inductance of coil 242 until the reciprocating compensating forces applied to the fuselage via cylinders 311a and 311b by reciprocating masses 316a and 316b result in a minimized vibrational effect on the pilot from the two per rev disturbances. The pilot may then adjust the amplitude of the compensating forces applied to the fuselage as a result of the reciprocation of masses 316a and 316b by varying the resistance of resistor 243. A stronger signal from amplifier 150 to the servo valves will result in a greater stroke length of the pistons and a greater acceleration of the masses and hence a greater force applied to the fuselage. By varying the inductance of coil 242 and the resistance of resistor 243 the pilot will be able to reach a point where the effects of the two per rev disturbance on the pilot's seat and the portions of the fuselage adjacent thereto will be minimized. Of course, the pilot need not minimize the effects of the two per rev vibrations but can reduce them to an acceptable level at his option.

The results of using the device of the present invention are graphically shown in FIG. 2 for a constant rotor blade rotation of 295 r.p.m. on a Bell Helicopter model 211 Huey Tug with two 30-pound masses 316a, 316b. The pistons and cylinders which moved the masses were located 14 inches off the centerline of the pilot's seat on the fuselage and about 2 feet forward of the pilot's seat. In FIG. 2 the vertical axis shows the magnitude acceleration the helicopter is subjected to as a result of two per rev disturbances while the horizontal axis indicates position along the length of the fuselage. The comfort threshold limits shown in FIG. 2 illustrates the region within which the vibratory accelerations are acceptable for the pilot from the point of view of fatigue and efficiency.

The solid line in FIG. 2 illustrates the vertical acceleration from two per rev disturbance in the above-identified helicopter at 295 r.p.m. of the rotor blades without the device of the present invention. The pilot's seat was subjected to vibratory accelerations sufficiently great so the pilot was outside the comfort threshold. Similarly the portions of the fuselage adjacent the pilot's seat, which include the passenger seats, were subjected to vibratory accelerations sufficiently great to be significantly outside the comfort threshold.

The dotted line illustrates the vertical vibratory accelerations along the helicopter fuselage with the device of the present invention being used as described above, with the phase and magnitude of the compensating force applied to the helicopter set to minimize the effects of two per rev disturbances at the pilot's seat. It can be seen that the vibratory acceleration at the pilot's seat was greatly reduced as was the acceleration in the portions of the helicopter adjacent the pilot's seat. There was some increase in the acceleration of the helicopter approximately at the midportion of the helicopter but increases in acceleration or vibration there are acceptable since they do not affect personnel.

Thus, it may be seen that, as illustrated in FIG. 2, the effect of the additional vibratory forces imposed on the fuselage by virtue of a reaction to the inertia of the vibrating masses 316a, 316b is to change the mode of vibration of the fuselage. For the particular test illustrated in FIG. 2, this mode of vibration was changed from the mode shown by the solid line to the mode shown by the dotted line. For different aircraft, the mode change will be different. For the same aircraft with different loading and under different flight conditions, the mode change may be different. Furthermore, the mode of the one per rev, both before and after compensation, will differ from the two per rev modes shown in FIG. 2. However, in all cases the pilot, by manipulating the controls which effect amplitude and phase of the control signal will be able to change the response mode of the fuselage to the undesired vibrations in such a fashion as to provide a comfortable ride in the pilot's cabin. Thus, broadly speaking, by means of this invention, the pilot is able to select an imposed vibrational condition on the fuselage which combines with the vibrational condition transmitted to the fuselage from the pylon to produce a net change in fuselage mode of vibration such as that illustrated in FIG. 2.

If the force applied to the fuselage results from a one per rev disturbance the one per rev control can be used in a similar manner to compensate for the effects of the one per rev disturbances. If the one per rev and two per rev disturbances are substantial, the pilot can simultaneously compensate for both of these disturbances by adjusting both one per rev and two per rev controls. The output of these controls are summed by the amplifier 150 to produce a complex waveform which will control the reciprocating masses in a manner to compensate for both the one per rev and two per rev disturbances.

It will be appreciated that the one per rev and two per rev controls can be operated by any person in the helicopter and need not necessarily be operated by the pilot. Further, while we have disclosed two reciprocating masses any number can be used.

While piston and cylinder arrangements have been disclosed any reciprocating motor could be used such as an electric motor. The use of piston and cylinder arrangements and their control elements are only a preferred practice of the present invention.

If desired, the control of the reciprocating masses may be programmed into a control system on the helicopter so that their movement will correlate to predetermined flight conditions. It would not then be necessary for the pilot to attend to this control function unless he desires to override the programmed control of the masses.

What is claimed is:
1. In a rotary wing aircraft having a fuselage, a rotor and rotor blade assembly rotatable with respect to the fuselage, the improvement of a system to compensate for vibratory forces generated by rotation of the rotor blade comprising:
   a. a signal generating means coupled to the rotor blade assembly for producing a first signal having at least one frequency component equal to that of a first one of the rotor blade assembly generated vibratory forces,
   b. a mass mounted on said fuselage for reciprocal motion relative to said fuselage, and
   c. control means coupled to said mass for causing said mass to produce compensating vibratory forces in the fuselage at a predetermined location therein which is removed from the location in the fuselage at which the vibratory forces generated by the rotor blade assembly and said mass are directly applied, said control means controlling said mass in response to said first signal and vibratory forces caused at a predetermined location by the vibratory forces of the rotor blade assembly,
   whereby the mode of vibration of said fuselage will be modified.

2. The system of claim 1 wherein said control means includes amplitude control means for varying the amplitude of the reciprocating force applied by said mass to said fuselage.

3. The system of claim 1 wherein said control means includes phase control means for varying the phase of the reciprocating force applied by said mass to said fuselage.

4. The system of claim 2 wherein said control means includes phase control means for varying the phase of the reciprocating force applied by said mass to said fuselage.

5. The system of claim 1 wherein said mass is mounted on said fuselage through first and second power elements, said mass being fixedly mounted on said first power element, said second power element being fixedly mounted on said fuselage, said power elements being adapted to move reciprocally relative to one another in response to said control means.

6. The system of claim 5 wherein said power elements are a piston with associated rod and a cylinder.

7. The system of claim 1 wherein:
   said signal generating means includes a first pickoff means to produce said first signal having a frequency equal to the frequency of the one per rev vibratory disturbance, and a second pickoff means to provide a second signal having a frequency equal to the frequency of the two per rev vibratory disturbance,
   said control means including means for combining said first signal having said first frequency and said second control having said second frequency into a composite control signal to control the reciprocation of said mass.

8. The system of claim 7 wherein said control means includes first amplitude control means for varying he amplitude of said first signal and second amplitude control means for varying the amplitude of said second signal.

9. The system of claim 7 wherein said control means includes first phase control means for varying the phase of said first signal and the second phase control means for varying the phase of said second signal.

10. The system of claim 9 wherein said control means includes first amplitude control means for varying the amplitude of said first signal and second amplitude control means for varying the amplitude of said second signal.

* * * * *

UNITED STATES PATENT OFFICE
CERTIFICATE OF CORRECTION

Patent No. 3,635,429    Dated January 18, 1972

Inventor(s) Rodney W. Balke et al.

It is certified that error appears in the above-identified patent and that said Letters Patent are hereby corrected as shown below:

Column 1, line 4, after "one" insert -- or --

Column 3, line 48, "to" should be -- two --

Column 4, line 2, after "force" insert -- in --

Signed and sealed this 30th day of May 1972.

(SEAL)
Attest:

EDWARD M. FLETCHER, JR.　　　　ROBERT GOTTSCHALK
Attesting Officer　　　　　　　　Commissioner of Patents